June 23, 1959 G. W. BAIN 2,892,104

DELAY LINE

Filed July 18, 1958

Inventor:
George W. Bain,
by Gust & Irish
Attorneys.

United States Patent Office 2,892,104
Patented June 23, 1959

2,892,104

DELAY LINE

George W. Bain, Fort Wayne, Ind., assignor to International Telephone and Telegraph Corporation Application July 18, 1958, Serial No. 749,473

15 Claims. (Cl. 307—106)

This invention relates generally to delay lines, and more particularly to a delay line system having means for preventing attenuation or decay of a pulse propagated along the delay line.

A delay line is a well known device in which the transmission of a signal or pulse of relatively short duration is delayed with respect to the length of time required for the transmission of the signal or pulse over an ordinary electrical circuit or transmission line; a delay line may either be formed as an elongated coaxial line with its length determining the delay of a pulse propagated along the line, or the electrical equivalent of such an elongated coaxial line in the form of lumped capicitance and inductance elements. While delay lines have many uses in electronic circuitry, it has been proposed to employ a delay line as an electrical switching device in order rapidly to switch a large number of elements in a given sequence; the propagation of the pulse along the delay line actuates switching means connected to the delay line at spaced intervals. More particularly, it has been proposed to utilize such delay line switching arrangements to provide the requisite rapid switching necessary for successful employment of electroluminescent phosphor display devices, as shown for example in Patent No. 2,818,531 to S. C. Peek, Jr. It has been found, however, that the conventional use of long delay lines as sequential switching devices has not been successful due to the absorption of energy from the delay line by the elements as they are switched along the length of the line; this high attenuation of the pulse as it is propagated along the delay line restricts the usable length of line which may be employed and thus the number of elements which can be switched for a given length of line. Since delay line switching is fundamentally desirable by virtue of its potentially extremely fast sequential switching action, it is desirable to provide a delay line system in which the travelling pulse is regenerated or prevented from decaying even though energy is extracted from the delay line at spaced points, thus substantially increasing the number of elements which can be accurately switched.

It is therefore an object of my invention to provide an improved delay line system.

Another object of my invention is to provide an improved delay line system in which the travelling pulse is prevented from attenuating along the line.

My invention in its broader aspects provides a delay line system in which the pulse travelling down the line is made to absorb regenerating energy from an external source by means of variable coupling devices which connect the delay line to an external source of power at appropriate times so that the propagated pulse is reinforced at these points along the line. With this arrangement, the available energy from the external power source may be adjusted so as to compensate for all losses along the delay line and the propagated pulse may then be given a constant amplitude along the entire length of the line. Furthermore, the external power source may be arranged so that the shape of the propagated pulse, which may have become distorted in its transit along the line is corrected.

More specifically, my invention contemplates the provision of a delay line with a pulse source coupled to one end thereof for propagating pulses along the delay line toward the other end, the delay line preferably having its other end terminated in its characteristic impedance to prevent reflections. A source of periodic regenerating signals is provided with at least one variable coupling device coupled between the regenerating signal source and the delay line at a point spaced from the one end. The regenerating signal source is arranged to provide signals having a period an integral of the time delay between the one end of the delay line and the point to which the coupling device is coupled so that a regenerating signal appears simultaneously with a pulse at the coupling device. The coupling device, which preferably is a transformer having a toroidal ferrite core, has a low coefficient of coupling when a pulse and a regenerating signal do not simultaneously appear thereon, and has a high coefficient of coupling when a pulse and regenerating signal do simultaneously appear thereon. Furthermore, the coupling device is arranged so that in its high coefficient of coupling state with the pulse and regenerating signal simultaneously impressed thereon, the regenerating signal augments or regenerates the pulse, thereby preventing attenuation of the pulse as it travels along the delay line. It will also be seen that a propagated pulse may be made to change in amplitude and slant or shape in a predetermined manner by variations in the characteristic of the external source or of the regenerating signal applied to each coupling device.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
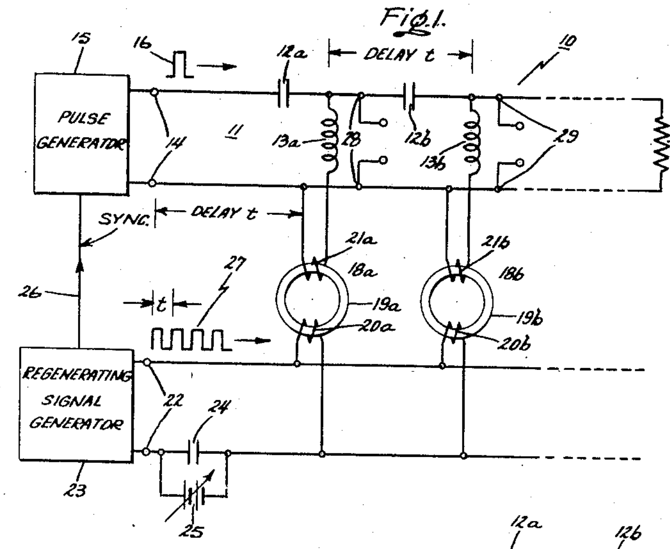
Fig. 1 is a schematic illustration of a preferred embodiment of my invention.

Referring now to Fig. 1, my improved delay line system, generally identified as 10, includes an elongated delay line 11, shown here as being formed of a plurality of spaced apart serially connected capacitors 12*a* and 12*b* and shunt inductances 13*a* and 13*b*; it will be readily understood that the delay line 11 is shown as being formed of lumped capacitance and inductance elements and while only two capacitance and inductance elements are shown, any necessary number may be utilized to provide the desired over-all time delay. It will also be readily understood that while a lumped impedance type of delay line is shown, an elongated coaxial type of delay line may equally advantageously be employed in accordance with my invention. The delay line 11 has its input terminals 14 connected to a pulse generator 15 arranged to propagate pulse 16, which may for example have a duration of one microsecond, down the delay line 11 toward its remote end which is preferably terminated by its characteristic impedance 17, as is well known in the art.

In accordance with my invention, the system of Fig. 1 is provided with a plurality of transformers 18*a* and 18*b* respectively having cores 19*a* and 19*b* with primary and secondary windings 20*a* and 21*a*, and 20*b* and 21*b* arranged thereon. The primary windings 20*a* and 20*b* of the transformers 18*a* and 18*b* are connected across the output terminals 22 of regenerating signal generator 23, a capacitor 24 being serially connected with one of the output terminals of the regenerating signal generator 23 and a source of unidirectional biasing voltage, shown here as battery 25, being connected across capacitor 24 for a purpose to be hereinafter more fully described. Regenerating signal generator 23 is preferably synchronously coupled to pulse generator 15, as at 26 and provides a periodic regenerating signal 27 having a period which is an integral of the time delay *"t"* between the input end 14 of delay line 11 and inductive element 13*a* to which transformer 18*a* is connected and likewise the delays *"t"* between each successive inductive element; it is thus required in accordance with my invention that each inductive element 13 be spaced from its adjacent inductive elements by a distance to provide approximately the same time delay as that provided between the input end of delay line 11 and the first inductive element 13. While the period of the regenerating signal 27 is preferably equal to the time delay *"t"* of delay line 11, it will become apparent hereinafter that any period which is an integral multiple of delay *"t"* may be utilized, i.e., for example 2*t*, 3*t*, etc.

The bias source 25 is arranged normally to energize primary windings 20*a* and 20*b* of transformers 18*a* and 18*b* so that the cores 19*a* and 19*b* are sufficiently saturated that low coupling between the primary and secondary windings 20 and 21 normally is provided; it will be recalled that the coupling between the primary and secondary windings of a transformer is low when the core is in a saturated condition and high when the core is unsaturated. It will be seen that with the regenerating signal 27 having a period which is an integral of the time delay *"t"* of the delay line 11, a regenerating signal will be impressed on primary winding 20*a* of transformer 18*a* simultaneously with the impression of the travelling pulse 16 on the secondary winding 21*a*. The pulse generator 15 and the regenerating signal generator 23, together with the primary and secondary windings 20 and 21 of the transformers 18*a*, 18*b*, etc., are arranged so that the regenerating signal 27 and pulse 16 which are simultaneously impressed on the primary and secondary windings 20 and 21 drive the core out of its saturated condition and into an unsaturated condition so that the coupling between the primary and secondary windings 20 and 21 is high thus permitting the high transfer of energy between the primary and secondary windings. Fortuitously, with this arrangement, the polarities of the regenerating signal 27 and pulse 16 will be such that the regenerating pulse 27 will reinforce or augment the delay line pulse 16, thus preventing attenuation of the pulse 16 as it travels down the delay line 11.

The delay line system 10 of Fig. 1 may be employed for sequential switching by taking energy from one or more sections of the line, for example by connecting the loads to be switched by the propagated pulse 16 across the line, as for example by terminals 28 and 29. It will now be understood that the switching terminals may be connected to the delay line 11 at any desired point or points and with any desired intervals in order to provide the requisite switching sequence and that the switching terminals 28 and 29 need not be associated with the inductive elements 13*a* and 13*b* and need not have the same spacing. As a matter of fact, it is contemplated that for a long delay line switching arrangement having a large number of switching terminals, a coupling transformer 18 will be necessary only at intervals of say every twenty switching terminals in order adequately to reinforce the propagated signal.

Figure 2:
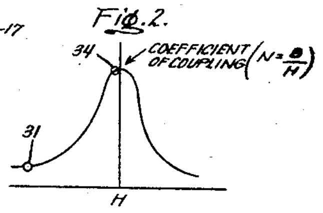
Fig. 2 is a curve showing the coefficient of coupling characteristic of a core suitable for use with the system of Fig. 1.
Figure 3:
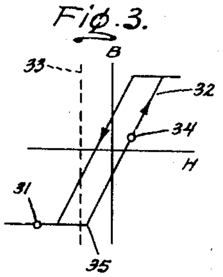
Fig. 3 shows the B-H characteristic of suitable core material.

Turning now to Figs. 2 and 3, there is respectively shown a plot of the coefficient of coupling and the hysteresis loop of the core material preferably employed for the cores 19 of the transformers 18 of Fig. 1. Since the system of Fig. 1 must be extremely fast acting, I consider it desirable to employ toroidal cores 19 formed of sharply saturating ferrite material having a square hysteresis loop characteristic as shown in Fig. 3; Fig. 3, which is somewhat idealized in form, shows a plot of the flux density (B) against magnetizing force (H) of such ferrite material, while Fig. 2 shows a coefficient of coupling $$\left(u=\frac{B}{H}\right)$$

against H for a typical ferrite material. It is thus seen that the bias provided by the battery 25 drives the cores 19 into the saturated region, as shown at points 31 in Figs. 2 and 3, the fixed bias 25 also displacing the hysteresis loop 32 as shown by the dashed line 33. As particularly shown in Fig. 2, with the cores 19*a* driven to point 31 on the curves of Figs. 2 and 3, the coefficient of coupling between the primary windings 20 and secondary windings 21 is low. When, however, a regenerating signal 27 and the pulse 16 are simultaneously impressed on the primary winding 20 and its associated secondary winding 21 and are polarized to oppose the fixed bias 25, the core 19 is driven out of its saturated condition 31 and into an unsaturated condition at point 34 in which the coefficient of coupling between the primary and secondary windings 20 and 21 is high. It will also be seen that it is necessary that the impression of a regenerating pulse 27 only on a primary winding 20 in the absence of the pulse 16 impressed on its secondary winding 21 be insufficient to drive the core 19 past the knee 35 of hysteresis loop 32 so that the cofficient of coupling is stil low.

It is thus seen that when a pulse 16 is not present at a given section of delay line 11, for example, assuming that pulse 16 has passed inductive element 13*a*, no current pulse will flow in winding 21*a*, however, a current pulse will flow in the primary winding 20*a* responsive to the next regenerating signal 27. By virtue however of the fixed bias provided by battery 25, the current flow in primary winding 20*a* responsive to the regenerating pulse 27 is insufficient to move the operating point of core 19*a* beyond the knee 35 of hysteresis loop 32 so that the coupling between primary winding 20*a* and secondary winding 21*a* remains low. However, when a pulse 16 reaches inductive element 13*a* of delay line 11, a current pulse flows in secondary winding 21*a* of transformer 18*a* simultaneously with the flow of the current pulse in primary winding 20*a* responsive to a regenerating signal 27, the sum of these currents producing a sufficient magnetizing force on the core 19*a* to move the operating point to point 34 on the hysteresis loop 32 and on coefficient of coupling characteristic of Fig. 2 so that the coupling is at that point high between the primary and secondary windings 20*a* and 21*a*, and energy is thus transferred from the regenerating signal source 23 to the delay line 11 in the form of a pulse which algebraically adds to the propagated pulse 16 in the delay line; it will be seen that the primary and secondary windings 20 and 21 must be so polarized that the phase of the regenerating pulse 27 is proper to reinforce the propagated pulse 16. It will be readily seen that adjustment of the fixed bias provided by battery 25 will vary the operating point of cores 19 and thus in turn the location of point 34 on the hysteresis loop 32 reached in response to simultaneous impression of a regenerating signal 27 and a pulse 16 on a transformer 18. Thus, the coefficient of coupling provided and in turn the degree of reinforcement of the pulse may be varied by a suitable adjustment of the fixed bias source 25.

Figure 4:
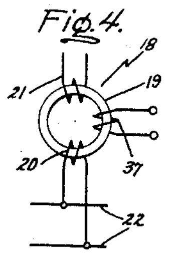
Fig. 4 is a fragmentary schematic illustration showing a modification of the system of Fig. 1.

Referring now to Fig. 4 in which like elements are indicated by like reference numerals, a single transformer 18 with its toroidal core 19 and primary and secondary windings 20 and 21 is shown. Recalling that the coefficient of coupling is high when the pulse 16 and a regenerating signal 27 are simultaneously impressed on the secondary winding 21 and primary winding 20, it will now be readily apparent that the switching pulse may be provided by arranging a second secondary winding 37 on core 19, winding 37 being adapted to be connected to the device to be switched. Thus, with only a regenerating pulse 27 impressed on primary winding 20, and in the absence of the impression of a pulse 16 on secondary winding 21, the coefficient of coupling between primary winding 20 and secondary winding 37 is low and no switching pulse will be provided. However, when a regenerating signal 27 and a pulse 16 are simultaneously present, the coupling between primary winding 20 and secondary winding 37 is high, as explained hereinabove, and the regenerating pulse 27 will thus induce a switching pulse in the second secondary winding 37. With this arrangement, therefore, it is not necessary to extract switching energy from the delay line 11.

Figure 5:
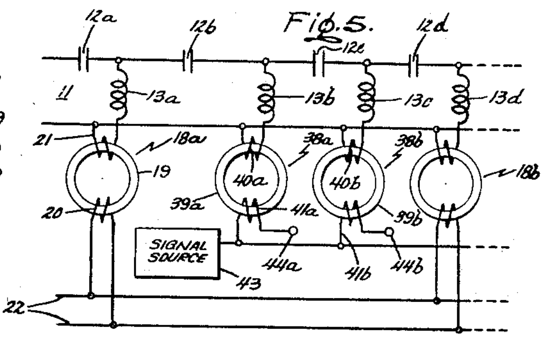
Fig. 5 is another fragmentary schematic view showing another modification of the system of Fig. 1.

Referring now to Fig. 5, it may be desirable to employ my improved regenerated delay line system for switching a modulated signal, for example to the matrix elements of an electroluminescent phosphor display device. Thus, in the arrangement of Fig. 5 in which like elements are again indicated by like reference numerals, an elongated section of delay line 11 is shown having series capacitors 12*a* through 12*d* and shunt inductances 13*a* through 13*d*. Here, the regenerating coupling transformers 18*a* and 18*b* are respectively coupled between lines 22 which are connected to the regenerating signal generator 23 and shunt inductance elements 13*a* and 13*d*, it being understood that the period of the regenerating signal 27 must now be an integral of the time delay of the pulse 16 between the inductance elements 13*a* and 13*d*. In order to provide the switching action, I provide another plurality of switching transformers 38*a* and 38*b* respectively having cores 39*a* and 39*b* and primary and secondary windings 40*a* and 41*a* and 40*b* and 41*b*. The primary windings 40*a* and 40*b* are respectively serially connected with the shunt inductance elements 13*b* and 13*c* while the secondary windings 41*a* and 41*b* respectively have one end connected to signal source 43, which may be a source of video information, and switching connections 44*a* and 44*b*. The cores 39*a* and 39*b* of the switching transformers 38*a* and 38*b* are preferably of the same type as those preferably employed for the regenerating coupling transformers 18*a* and 18*b*, i.e., having toroidal ferrite cores, however, here the transformers 38*a* and 38*b* are employed to vary the impedance of the secondary windings 41*a* and 41*b*. It will now be recalled that the impedance of a winding arranged on a highly saturated core is very low whereas the impedance of a winding arranged on an unsaturated core is relatively high. Thus, the switching transformers 38*a* and 38*b* are arranged so that their cores 39*a* and 39*b* are respectively and sequentially saturated responsive to impression of the travelling pulse 16 thereon, this sequential saturation of the cores 39*a* and 39*b* respectively and successively producing a marked reduction in the impedances of the windings 40*a* and 40*b*. Thus, the windings 40*a* and 40*b* act as gate windings for successively switching the signal source 43 to successive load elements connected to the terminals 44*a* and 44*b*. It will now be seen that when the travelling pulse 16 is impressed on the inductive element 13*b*, a current pulse flows in the winding 40*a* of transformer 38*a* thus causing its core 39*a* to be saturated and producing a marked reduction in the impedance of the winding 41*a*, thus effectively connecting signal source 43 to the switching terminal 44*a*. In this instance, however, since the travelling pulse 16 has not yet reached the inductance 13*c*, no current pulse is flowing in winding 40*b* of transformer 38*b* and thus winding 41*b* has a relatively high impedance so that the signal source 43 is not yet connected to the switching terminals 44*b*.

Figure 6:
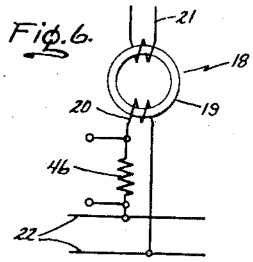
Fig. 6 is a fragmentary schematic view showing a still further modification of the system of Fig. 1.

Referring now to Fig. 6, in which like elements are again indicated by like reference numerals, it will be seen that in lieu of the secondary winding 37 of Fig. 4, a switching signal may be provided by connecting a suitable resistor 46 in series with primary winding 20 of transformer 18. Thus, in the absence of simultaneous impression of a regenerating signal 27 and a pulse 16 on the primary winding 20 and secondary winding 21 respectively, the core 19 will, as before, be saturated so that the impedance of the primary winding 20 is relatively low and thus a relatively high current will flow through the resistor 46, thereby producing a substantial voltage drop thereacross. However, when a regenerating signal 27 and pulse 16 are simultaneously impressed on the primary and secondary windings 20 and 21, the core 19 is driven out of saturation, thereby substantially increasing the impedance of the primary winding 20 and thus reducing the current flow through resistor 46 and thus the voltage drop thereacross. It is thus seen that a signal is provided across resistor 46 which may be employed in a switching function, again eliminating the necessity of extracting energy from the delay line 11.

Figure 7:
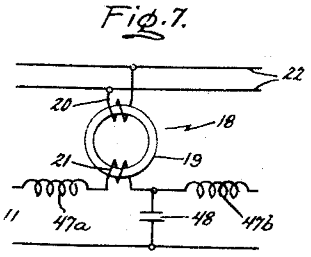
Fig. 7 is another fragmentary schematic illustration showing yet another modification of the system of Fig. 1.

Referring now to Fig. 7, in which like elements are still indicated by like reference numerals, it will be readily apparent that the delay line 11 may be constituted of series inductive elements 47*a* and 47*b* and shunt capacitors 48, the secondary windings 21 on the transformers 18 again being serially connected with the inductive elements 47 as shown.

Figure 8:
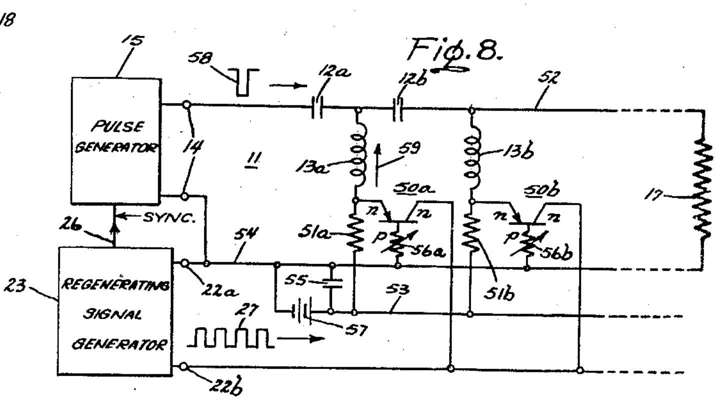
Fig. 8 is a schematic illustration showing another embodiment of my invention employing transistors as the coupling devices.

Turning now to Fig. 8, there is shown another embodiment of my invention employing the same basic principles as the prior embodiments but employing a different coupling element. Here, with like elements once more being indicated by like reference numerals, the delays line 11 is formed of series capacitor elements 12*a* and 12*b* and shunt inductive elements 13*a* and 13*b*, pulse generator 15 being coupled to input terminals 14 of the delay line 11 and the other end of the delay line being terminated in its characteristic impedance 17. Here, n-p-n transistors 50*a* and 50*b* are utilized as the coupling elements. It will be seen that resistors 51*a* and 51*b* are respectively serially connected with the inductive elements 13*a* and 13*b* between the capacitive line 52 of delay line 11 and another line 53 which in turn is connected to the other side 54 of delay line 11 by a coupling capacitor 55. Transistors 50*a* and 50*b* respectively have their emitters connected between the inductive and resistive elements 13*a*—51*a* and 13*b*—51*b* and their bases connected to side 54 of delay line 11 by variable resistors 56*a* and 56*b*. Regenerating signal generator 23 has one output terminal 22*a* connected to side 54 of delay line 11 and its other output terminal 22 is connected to the collectors of transistors 50*a* and 50*b* as shown. A suitable source of direct current back-bias potential, shown here as battery 57, is connected across capacitor 55 as shown.

The pulse generator 15 is arranged to provide negative-going pulses 58 while regenerating signal generator 23 is arranged to provide positive-going regenerating signals 27, being synchronized with the pulse generator 15 by a synchronizing connection 26 as shown. The battery 57 is arranged so as to back-bias the emitters of the transistors 50*a* and 50*b* and it will be readily seen that the regenerating signals 27 are in a direction to back-bias the collectors of the transistors 50*a* and 50*b*. It will be readily understood that in common with the other embodiments of my invention, the period of the regenerating signals 27 is an integral of the delay between the input terminals 14 and the inductive element 13*a* and in turn the delays between successive inductive elements of the delay line.

In the operation of the system of Fig. 8, it will be seen that propagation of the negative-going pulse 58 down the delay line 11 causes a pulse of current through capacitor 55, resistor 51*a* and inductive element 13*a* in the direction shown by the arrow 59. The voltage drop now appearing across resistor 51*a* instantaneously raises the potential of the base of transistor 50*a* while lowering the potential of the emitter, thus causing transistor 50*a* to conduct and in essence connecting the emitter to the collector. Recalling now that a regenerating signal 27 is simultaneously applied to the collector of transistor 50*a* at the same instant the pulse 58 appears in the emitter circuit, the regenerating signal 27 will cause current flow through inductance 13*a* in the same direction 59 as the current flow produced by virtue of the pulse 58. It is thus seen that in common with the embodiments of my invention employing transformers 18, simultaneous appearance of a travelling pulse 58 and a regenerating signal 27 on the transistor 50*a* causes the delay line to receive energy from the regenerating signal generator, i.e., the pulse 58 is augmented or regenerated as it travels down the delay line 11 with attenuation thus being prevented. It will be readily understood that the variable resistors 56*a* and 56*b* respectively connected in the base circuits of the transistors 50*a* and 50*b* control the current flow in the collector to emitter circuits and thus, the amount of regeneration of the pulse 58 as it travels down delay line 11 may be controlled by suitable adjustment of the resistors 56*a* and 56*b*. It will further be readily seen that switching signals may be taken from the delay line at any desired point or points in the manner shown in Fig. 1 or by taking a signal from the resistors 51*a* and 51*b* in the manner of Fig. 6. In addition, separate switching elements may be provided in the embodiment of Fig. 8 in the manner of Fig. 5.

It will be readily understood that other transistor switching devices may be employed in accordance with my invention such as p-n-p junction or point contact, surface barrier, four-element, etc.

Figure 9:
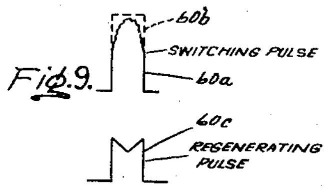
Fig. 9 illustrates the reshaping of the travelling or switching pulse by means of a suitable choice of the waveshape of the regenerating pulse in accordance with my invention.

It will now be seen that the regenerating signals 27 may be of any appropriate waveshape, the only essential feature being that their period be an integral of the time delay "*t*" of the delay line 11. Thus, while a pulsed regenerating signal 27 is shown in the drawings, the regenerating signal may also be a sine wave. Furthermore, by referring to Fig. 9, it will be understood that the switching pulse which is propagated down the delay line may become distorted in transit and it is thus seen that my improved system presents the possibility of not only regenerating or augmenting the pulse as it is propagated down the delay line, but also reshaping it to the desired shape. Thus, where the switching pulse has become distorted as shown at 60*a* in Fig. 9, it may be reshaped to the desired square pulse, as shown in dashed lines at 60*b*, by employing a regenerating pulse 60*c* having a pronounced third harmonic content, as shown. It will now be readily seen that the shape of the switching pulse may be modified in transit by appropriate selection of the waveshape of the regenerating pulse and further that the amplitude of the switching pulse may be varied from one point to another on the delay line as desired, merely by varying the degree of coupling provided in each transformer stage 18 or transistor stage 50.

It will now be readily seen that I have provided an improved delay line system, eminently suited for use in a delay line switching system, in which the deleterious attenuation of the switching pulse as it is propagated down the delay line encountered in prior systems of this type is prevented by regenerating or augmenting the switching pulse at selected appropriate points along the delay line. My improved system therefore permits the employment of a long delay line with many switching connections being made thereto, the system thus being suitable for scanning purposes in connection with such devices as electroluminescent phosphor display devices.

While I have described above the principles of my invention in connection with specific apparatus, it is to be clearly understood that this description is made only by way of example and not as a limitation to the scope of my invention.

What is claimed is:

1. In combination: a delay line, a pulse source coupled to one end of said delay line for propagating pulses along the same toward the other end thereof; a source of periodic regenerating signals; and a variable coupling device coupled between said regenerating signal source and said delay line at a point spaced from said one end thereof and said regenerating signal source, said regenerating signal source providing signals having a period an integral of the time delay between said one end of said delay at said coupling device simultaneously with a pulse; said coupling device having a low coefficient of coupling when a pulse and a regenerating signal do not simultaneously appear thereon and having a high coefficient of coupling when a pulse and regenerating signal simultaneously appear thereon, said coupling device being arranged when in its high coefficient of coupling state so that the regenerating signal appearing thereon augments the pulse appearing thereon thereby preventing attenuation of the same along said delay line.

2. The system of claim 1 in which said variable coupling device comprises a transformer having a core with primary and secondary windings coupled respectively to said regenerating signal source and said point on said delay line, said transformer being arranged so that the core thereof is in a saturated condition in the absence of simultaneous appearance of a regenerating signal and a pulse on said primary and secondary windings respectively thereby providing a low coefficient of coupling between said windings and so that simultaneous appearance of a regenerating signal and a pulse on said primary and secondary windings respectively drives said core out of saturation thereby providing a high coefficient of coupling between said windings, said windings being arranged so that said regenerating signal on said primary winding induces a signal in said secondary winding which aids said pulse appearing thereon.

3. The system of claim 2 in which said transformer has a toroidal ferrite core with a substantially square hysteresis loop.

4. The system of claim 2 further comprising a source of unidirectional bias voltage coupled in circuit with said primary winding and arranged normally to drive said core toward saturation.

5. The system of claim 1 in which said delay line comprises lumped capacitance and inductance elements with said coupling device being serially connected with an inductance element.

6. The system of claim 2 in which said delay line comprises lumped capacitance and inductance elements with the secondary winding of said transformer being serially connected with an inductance element.

7. The system of claim 1 in which said regenerating signal source is arranged to provide regenerating signals having a waveshape which corrects distortion in said pulses.

8. The system of claim 1 in which said coupling device is a transistor and further characterized in that said regenerating signal source is coupled to the collector of said transistor and arranged so that said regenerating signals normally back bias the same, the emitter and base of said transistor are coupled to said delay line, and a source of unidirectional voltage is coupled normally to back bias the emitter of said transistor.

9. The system of claim 2 in which said transformer has a third winding thereon for providing a switching signal responsive to simultaneous appearance of said regenerating signal and pulse on said primary and secondary windings respectively.

10. The system of claim 2 in which an impedance is serially connected with said primary winding for developing a switching signal thereacross responsive to simultaneous appearance of said regenerating signal and pulse on said primary and secondary windings respectively.

11. The system of claim 2 in which said delay line comprises at least one series capacitor and at least one shunt inductance with said transformer secondary winding being connected in series with said inductance.

12. The system of claim 2 in which said delay line comprises at least one series inductance and at least one shunt capacitor with said transformer secondary winding being serially connected with said inductance.

13. The system of claim 1 in which said regenerating signal source is synchronously coupled to said pulse source.

14. In combination: a delay line having a plurality of spaced lumped capacitance and inductance elements, said delay line having a pulse source coupled to one end and being terminated at its other end with its characteristic impedance; a source of periodic regenerating signals; and a plurality of variable coupling devices coupled respectively between at least some of said inductance elements and said regenerating signal source; said regenerating signal source being arranged to provide signals having a period an integral of the time delay between the inductance elements to which said coupling devices are coupled whereby a regenerating signal appears simultaneously with a pulse being propagated down said delay line successively at each of said coupling devices; said coupling devices having a low coefficient of coupling when a pulse and regenerating signal do not appear simultaneously thereon and having a high coefficient of coupling when a pulse and regenerating signal simultaneously appear thereon, said coupling devices being arranged when in their high coefficient of coupling state so that the regenerating signals appearing thereon successively augment the pulse being propagated down said delay line thereby preventing attenuation of the same.

15. In combination: a delay line having a series capacitor element and a shunt inductance element spaced from the input end of said line; a pulse source coupled to said input end of said delay line; a source of periodic regenerating signals; a resistor and capacitor connected in series with said inductance element, an n-p-n transistor having its emitter and base coupled across said resistor and capacitor, a source of unidirectional voltage coupled across said capacitor and arranged to back bias said emitter; said regenerating signal source being coupled to the collector of said transistor and being arranged so that said regenerating signals normally back bias the same; said regenerating signal source providing signals having a period an integral of the time delay between said input end of said delay line and said inductance element whereby a regenerating signal appears simultaneously with a pulse at said transistor; said transistor being normally non-conductive in the absence of simultaneous appearance of a pulse and regenerating signal thereon; said pulse source being arranged so that said pulse when simultaneously impressed on said transistor with a regenerating signal causes said transistor to conduct and the regenerating signal to augment said pulse thereby preventing attenuation of the same along said delay line.

No references cited.

UNITED STATES PATENT OFFICE
CERTIFICATE OF CORRECTION

Patent No. 2,892,104

June 23, 1959

George W. Bain

It is hereby certified that error appears in the printed specification of the above numbered patent requiring correction and that the said Letters Patent should read as corrected below.

Column 8, line 22, after "delay", second occurrence, insert -- line and said point whereby a regenerating signal appears --.

Signed and sealed this 6th day of October 1959.

(SEAL)
Attest:

KARL H. AXLINE
Attesting Officer

ROBERT C. WATSON
Commissioner of Patents